United States Patent
Wagner

(10) Patent No.: US 6,195,382 B1
(45) Date of Patent: Feb. 27, 2001

(54) HIGH TEMPERATURE MOLTEN METAL REACTOR AND WASTE TREATMENT METHOD

(75) Inventor: Anthony S. Wagner, Bee Caves, TX (US)

(73) Assignee: Clean Technologies International Corporation, Lakeway, TX (US)

( * ) Notice: Subject to any disclaimer, the term of this patent is extended or adjusted under 35 U.S.C. 154(b) by 0 days.

(21) Appl. No.: 09/274,583

(22) Filed: Mar. 23, 1999

(51) Int. Cl.[7] .............................. H05B 6/34; F27D 23/04; G21F 9/00; G21F 9/34
(52) U.S. Cl. ......................... 373/146; 110/237; 110/250; 110/346; 219/674; 219/677; 373/138; 588/1; 588/201; 588/900
(58) Field of Search ..................................... 110/235, 237, 110/242, 243, 250, 346, 101 R, 109, 191, 193; 588/1, 15, 18, 20, 201, 900; 219/660, 674, 676, 677; 373/4, 6, 7, 138, 139, 140, 142, 146, 147

(56) References Cited

U.S. PATENT DOCUMENTS

| 3,019,275 | * | 1/1962 | Lorenz .............................. 373/146 X |
| 3,917,896 | * | 11/1975 | Nakagawa et al. ............. 373/142 X |
| 5,000,101 | | 3/1991 | Wagner . |
| 5,167,919 | * | 12/1992 | Wagner . |
| 5,271,341 | | 12/1993 | Wagner . |
| 5,301,620 | * | 4/1994 | Nagel et al. .......................... 110/346 |
| 5,666,891 | * | 9/1997 | Titus et al. ....................... 110/346 X |
| 6,037,517 | * | 3/2000 | Wagner ................................... 588/1 |

FOREIGN PATENT DOCUMENTS 2 297 916 * 8/1976 (FR) ................................... 373/146

* cited by examiner

Primary Examiner—Ira S. Lazarus
Assistant Examiner—Ljiljana V. Ciric
(74) Attorney, Agent, or Firm—Russell D. Culbertson; Shaffer & Culbertson, LLP

(57) ABSTRACT

A molten metal reactor (10) includes a reactor vessel having a heating section (11) formed from a dielectric material. The reactor vessel also includes a reaction section (12) connected to heating section (11). An induction heating coil (18) is associated with the reactor vessel heating section (11) and produces an electromagnetic field within a field area (19). A portion of the field extends through the heating section (11) for inductively heating a reactant metal (14) contained in the heating section, while a dielectric spacing material (25) positioned around induction heating coil (18) isolates electrically conductive materials from the induction heating field (19). A circulating arrangement (20) circulates molten reactant metal between the heating section (11) and reaction section (12) to react waste material introduced into the reactor in the reaction section, outside of the induction heating field (19).

20 Claims, 3 Drawing Sheets

HIGH TEMPERATURE MOLTEN METAL REACTOR AND WASTE TREATMENT METHOD

TECHNICAL FIELD OF THE INVENTION

This invention relates to molten metal reactors and, more particularly, to an inductively heated molten metal reactor capable of operating at high temperatures.

BACKGROUND OF THE INVENTION

Molten metal reactors may be used to treat a wide variety of waste materials including wastes which include halogenated hydrocarbons, biomedical waste, and radioactive wastes. Molten metal reactors utilize a bath of molten reactant metal which may include aluminum, magnesium, and/or lithium, for example, along with other metals. The atmosphere above the bath is preferably purged of oxygen. When waste material is placed in contact with the molten reactant metal, the metal reacts with the organic molecules in the waste material to strip halogen atoms and form metal salts. The reaction also liberates carbon along with other elements such as hydrogen and nitrogen. Carbon, hydrogen, nitrogen, and some metal salts may be removed from the molten metal reactor in a gaseous form. Metals which may be included in the waste material, or are liberated from the waste material, may alloy with the bath. Other reaction products or liberated materials collect at the surface or bottom of the bath and may be removed by suitable means.

Molten metal reactors require a heating arrangement to heat the reactant metal to a molten state and then maintain the reactant metal in a molten state at a desired temperature as waste material is added to the bath. U.S. Pat. No. 5,000,101 to Wagner shows a molten metal reactor having an induction heater for heating the reactant metal. U.S. Pat. No. 5,271,341 to Wagner discloses a two-chamber molten metal reactor having a hydrocarbon-fired heater in one of the chambers. This two-chamber arrangement allows the reactant metal to be heated with hydrocarbon-fired burners while maintaining a separate area in which reaction products may collect for removal.

Hydrocarbon-fired heaters are desirable for many molten metal reactor applications. However, other applications for molten metal reactors cannot accommodate heating using hydrocarbon-fired burners. For example, a molten metal reactor may be highly desirable for treating biomedical wastes and other wastes generated aboard a ship. However, a sufficient hydrocarbon supply may not be readily available aboard the ship to provide the required heating.

Induction heaters are well-suited for fixed plants which have access to a suitable electric power supply. However, the electromagnetic field produced by induction heaters has, prior to the present invention, limited the temperatures at which the molten metal reactor could be operated. This temperature limitation arose from the fact that portions of the electromagnetic field extended beyond the molten reactant metal and passed through the reactor vessel and related equipment. The electromagnetic field generated heat in these metallic structural elements as well as in the reactant metal. Therefore, structural elements associated with the molten metal reactor had to be comprised of metals which maintained strength at high temperatures. Operating temperatures still had to be kept low enough to maintain the structural integrity of structural elements associated with the molten metal reactor.

The temperature limitations associated with prior molten metal reactors also effectively limited the types of wastes which could be treated. For example, although wastes which included transuranic elements (all elements having an atomic number greater than uranium), could be treated in prior molten metal reactors, the treatment was slowed by the temperature of the molten metal bath. In prior art molten metal reactors, the molten metal temperature was insufficient to cause transuranic metals to go to a molten state. Thus, transuranic metals dissolved relatively slowly in prior art molten metal reactors, and the transuranic elements alloyed with the reactant metals only after this relatively slow dissolution process.

SUMMARY OF THE INVENTION

It is an object of invention to provide an inductively heated molten metal reactor capable of operating at high temperatures and suitable for shipboard and other, fixed, applications. It is also an object of the invention to provide a method for treating wastes in a high temperature molten metal reactor. A further object of the invention is to provide an apparatus and method for treating transuranic wastes.

In order to accomplish these objects, a molten metal reactor according to the invention includes a unique induction heater arrangement and reactor vessel structure. The reactor vessel includes a heating section and a reaction section. The heating section of the vessel is preferably made of a dielectric material, while the reaction section may include conducting metals but is preferably also made entirely of dielectrics. An induction heating coil is associated with the heating section of the reactor vessel and is driven to produce an electromagnetic field in a field area which passes through at least part of the reactor vessel heating section. However, the reaction section of the reactor vessel is located outside of the field area.

The reactor according to the invention also includes a circulating device, also preferably located outside of the field area. The circulating device causes the molten metal contained in the reactor vessel to circulate between the heating section of the reactor vessel and the reaction section of the vessel. The reactor also preferably includes a waste input arrangement and a reaction product removal arrangement, both of which are preferably associated with the reaction section of the vessel, and located outside of the field area.

In operation, the electromagnetic field developed by the induction coil melts the reactant metal in the heating section of the reactor vessel and maintains the reactant metal in a molten state at a desired operating temperature. The circulating arrangement circulates the molten reactant metal from the heating section of the reactor vessel to the reaction section where waste material may be introduced and reacted. Although the introduction and reaction of waste material cools the molten reactant metal in the reaction section of the reactor, the circulation induced by the circulating arrangement constantly adds fresh molten reactant metal to the reaction section and carries the cooled reactant metal back to the heating section of the reactor vessel for re-heating.

Because no unprotected metallic structural elements are located within the field area, the operating temperature of the reactor is not limited by the strength limitations of such structural elements. Thus, the molten reactant metal may be maintained at a very high temperature. For example, molten reactant metal temperatures of approximately 1800 degrees Celsius may be used for wastes which include Thorium.

In the order to ensure that the electromagnetic field does not substantially heat metallic structural elements which may be associated with or located near the reactor, the invention preferably employs a dielectric spacing material to isolate electrically conductive components from the field. The spacing means or arrangement may include a variety of different dielectric materials. These materials are positioned around the induction heating coil and heating section of the reactor vessel. The material used for the spacing arrangement may comprise any material which is substantially unaffected by the electromagnetic field, that is, any material which is not substantially heated by the interaction of the field and the material.

Although the spacing material and other materials positioned in the area encompassed by the electromagnetic field are preferably restricted to dielectric materials, conducting materials may also be included in the field area if such materials are properly protected. Examples of such protected materials are structures built up from alternating layers of electrically conductive materials and dielectrics. Also, conductive materials in the field area may be protected by heat transfer to a circulating coolant.

In the preferred form of invention, the waste input arrangement, reaction product removal arrangement, and circulating arrangement all include metallic structural elements coated with a refractory material in areas in which may come in contact with the molten reactant metal. The refractory material is commonly necessary to prevent the molten reactant metal from attacking and damaging the structural metal. Since these devices commonly included metallic components, they are, according to the invention, preferably positioned outside of the field area. Placing these devices outside the electromagnetic field area prevents the metal from being heated substantially by the field.

It will be appreciated that the electromagnetic field produced about the induction heating coil does not end abruptly at a certain distance from coil. Rather, the field intensity at a given point is dependent upon the distance from the coil, the shape of the coil, and the current passing through the coil. For a cylindrical coil of a given radius, and given the currents required to maintain a desirable temperature in the molten metal bath, the field is sufficiently weak to prevent substantial heating in metallic components located a distance of approximate one radius from the nearest point on the coil. Thus, for the purposes of this invention, where a generally cylindrical coil is employed as the induction heating element, the field area is defined as the area bounded by a one radius distance from the nearest point on the coil. Although the electromagnetic field exists outside of the field area defined in this fashion for purposes of this disclosure and the accompanying claims, the electromagnetic field outside of this area does not heat electrically conductive components sufficiently to place a practical operating temperature limitation on the reactor. A molten metal reactor according to the invention may be operated at reactant metal temperatures of approximately 2,000 degrees Celsius or more in some cases.

In the preferred the form of invention, the induction heating coil has a cylindrical shape and is positioned around a cylindrically shaped heating section of the reactor vessel. However, invention is not limited to this preferred cylindrical coil and reactor vessel heating section shape. Regardless of its shape, the coil may be made of a tubular conducting material such as copper. As is known in the induction heating field, a coolant fluid may be circulated through the conductor to cool the coil material to an acceptable coil temperature.

A molten metal reactor according to the invention is not limited to treating any particular type of waste. However, the invention has particular application for wastes in which require a high temperature molten reactant metal. Thus, the invention is well-suited for treating transuranic wastes and mixed wastes which include transuranic elements or compounds including transuranic elements. Organic compounds which may be included in a mixed transuranic waste, and compounds which include transuranic elements, are broken down by the reactant metal to liberate the non-transuranic elements to form metal salts or pure elemental materials. The transuranic elements alloy into the molten reactant metal, which preferably includes radiation absorbing metals such as lead and tungsten. The contaminated molten reactant metal may then be cooled to form an ingot in which the transuranic elements may be safely stored.

A reactor according to the invention is also particularly useful in shipboard applications. In shipboard applications, the molten metal reactor is inevitably surrounded by metallic components. However, the reactor structure according to the invention ensures that these metallic components are not damaged or otherwise affected by the induction heater.

These and other objects, advantages, and features of the invention will be apparent from the following description of the preferred embodiments, considered along with the accompanying drawings.

DESCRIPTION OF THE PREFERRED EMBODIMENTS

Figure 1:
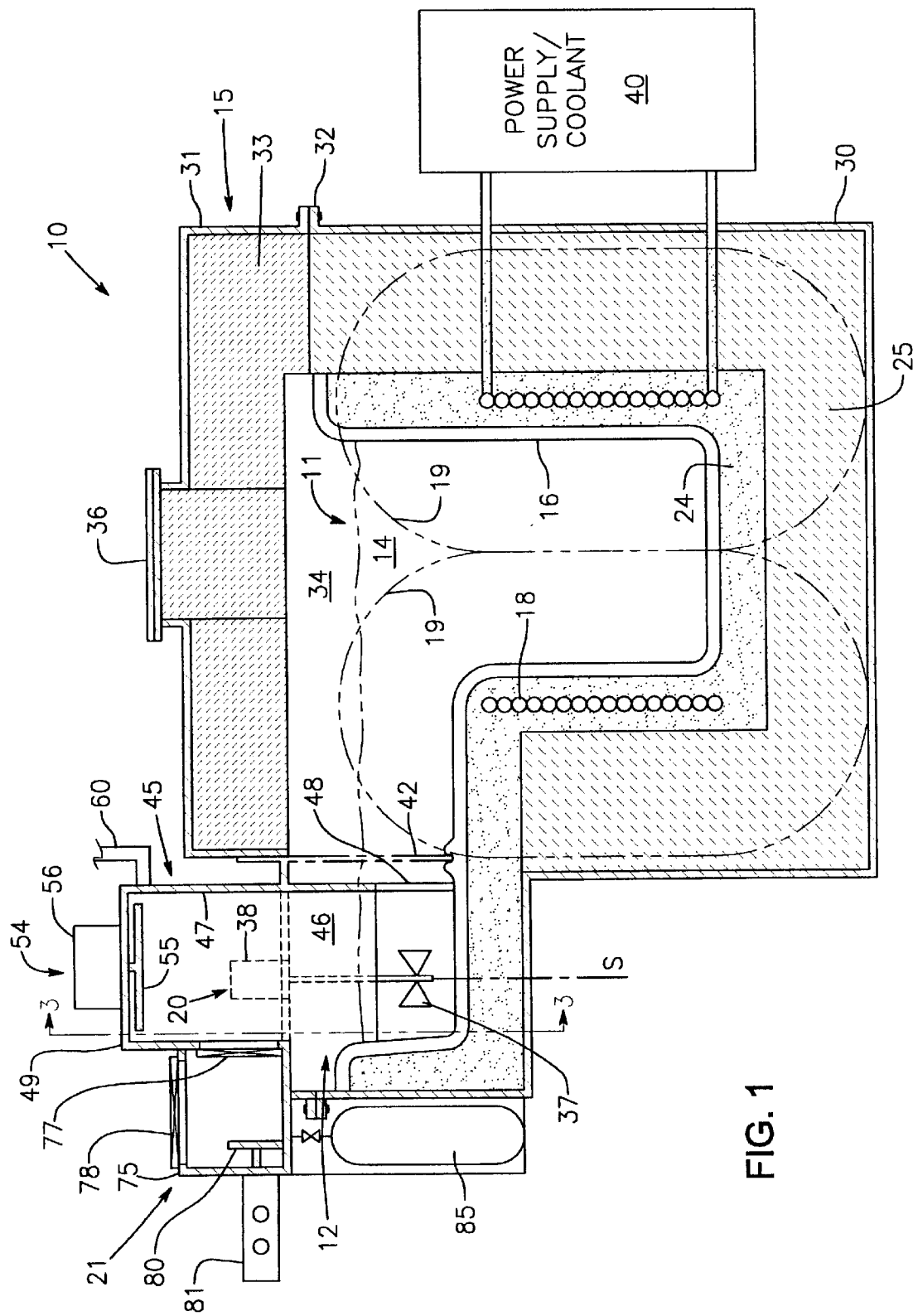
FIG. 1 is a somewhat diagrammatic view in section showing a molten metal reactor embodying the principles of the invention.
Figure 2:
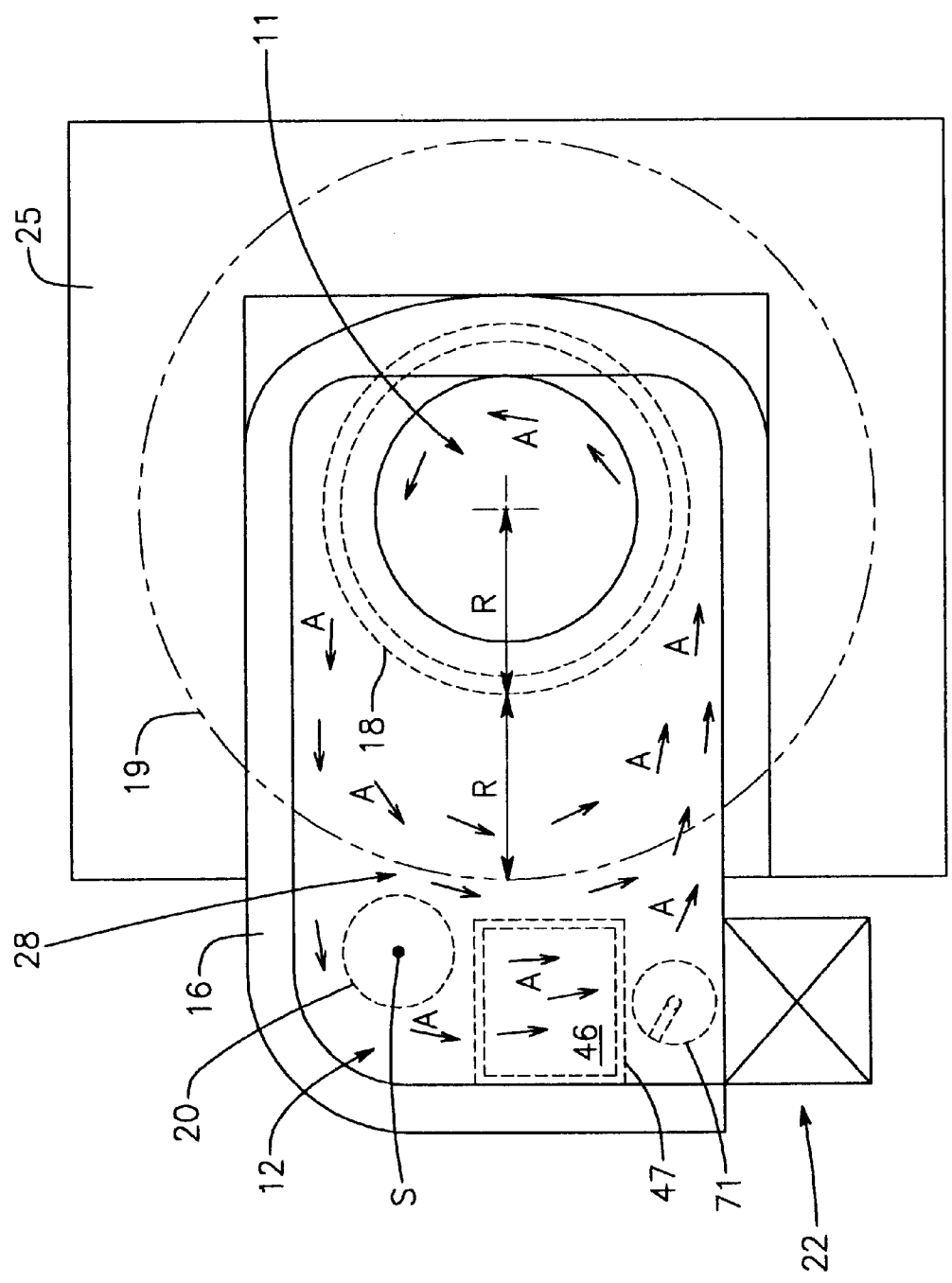
FIG. 2 is a diagrammatic top view of the molten metal reactor shown in FIG. 1, with the cover removed and showing the relative positions of the various components of the reactor.
Figure 3:
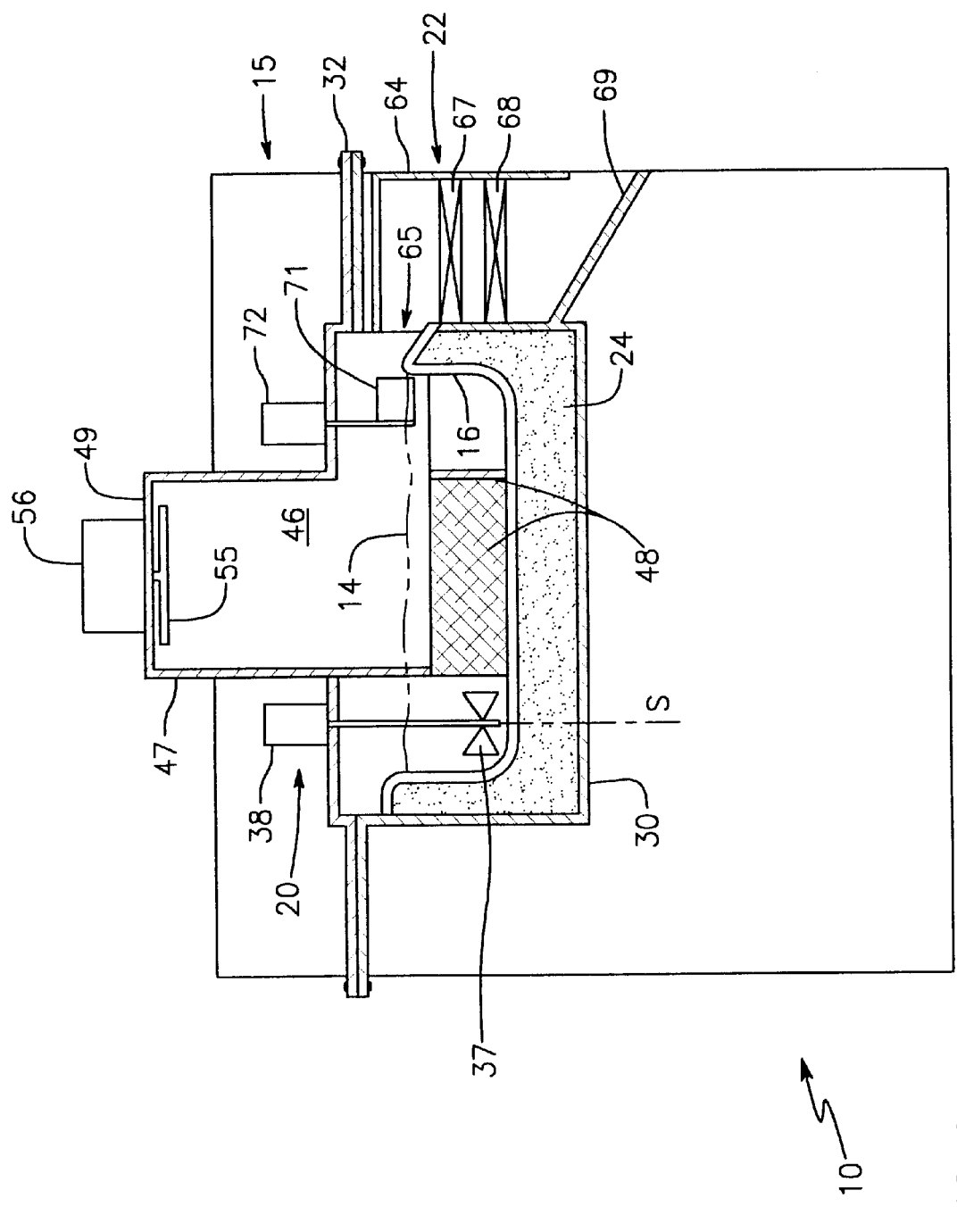
FIG. 3 is a somewhat diagrammatic view in section taken along line 3—3 in FIG. 1.

FIGS. 1 through 3 illustrate one preferred form of a molten metal reactor 10 embodying the principles of invention. Referring particularly to FIG. 1, reactor 10 includes a reactor vessel, including a heating section 11 and a reaction section 12, adapted to contain a molten reactant metal 14. A cover 15 extends over both the heating and reaction sections of the vessel. The heating section 11 and reaction section 12 of the reactor vessel are both lined with a refractory material 16. Reactor 10 also includes and induction heating coil 18 associated with reactor vessel heating section 11. Induction heating coil 18 produces an electromagnetic field having an outer boundary 19. A molten metal circulating arrangement 20, waste input arrangement 21, and reaction product removal arrangement including solids removal arrangement 22 are also each preferably associated with the reaction section 12 of the reactor vessel. Also, although not shown in the drawings, a suitable drain may be associated with heating section 11 through which spent molten metal may be drained to form ingots.

In the illustrated preferred form of the invention, induction heating coil 18 is supported by a loose silica material 24 between lining 16 and a dielectric spacing material 25. The lining 16 is preferably cast in one piece from a fused silica or other refractory material. Spacing material 25 may be any suitable material, such as ceramic brick for example, and is positioned in the area of field 19 extending beyond coil 18 and coil supporting material 24. In this form invention, field 19 extends from the nearest point of the coil outwardly a distance of approximate one coil radius R. Sufficient spacing material 25 is used to encompass this field area around coil 18.

Reaction section 12 of the reactor vessel is defined as a portion of the reactor vessel which is located outside of the field area boundary 19. As best shown in FIG. 2, reaction section 12 is open to heating section 11 along a boundary shown generally at reference numeral 28. This allows molten reactant metal 14 to circulate between the two sections 11 and 12 of the vessel as will be discussed below. It will also be appreciated that since vessel reaction section 12 is located outside of field area 19, it may be supported by, or include, electrically conductive structural elements such as metals.

Both sections 11 and 12 of the reactor vessel, along with the spacing material 25, are all preferably housed in a lower containment shell 30. Cover 15 also includes a shell 31 which, as shown best FIG. 1, is connected to lower containment shell 30 by flange 32. Since no portions of either shell 30 or 31 pass through the field area 19, these elements may be made of electrically conductive metals, preferably coated with refractory material at any point which may come in contact with molten reactant metal 14. Cover 15 also includes a light-weight refractory insulating material 33, such as a ceramic or fused silica wool, in areas of the cover which overlie heating section 11. This flanged cover arrangement forms a sealed area 34 above the reactant metal 14. Area 34 is maintained in an anaerobic or oxygen-deficient state to prevent the molten reactant metal from reacting with oxygen to form excessive amounts of metal oxides. Oxide formation may also be reduced by maintaining a carbon or graphite layer (not shown) on the surface of molten reactant metal 14 in areas outside of the waste reaction areas discussed further below.

Cover 15 also preferably includes an access opening 36. Access opening 36 provides access to the heating section 11 of the reactor vessel for adding reactant metal to the reactor. Reactant metal is added to initially charge the reactor and to replace metals used up in reactions with the waste material being treated. Although access opening 36 is shown in FIGS. 1 and 2 as a simple flanged opening, those skilled in the art will appreciate that it may be desirable to use an airlock door arrangement for adding reactant metals without introducing excessive amounts of oxygen to the area 34 above the level of molten reactant metal 14. Such an airlock door arrangement is to be considered equivalent to the access opening shown in the figures. Also, small quantities of reactant metals may be added through the waste input arrangement 21 described below.

The preferred circulating arrangement 20 includes a stirring device 37 which is rotated about an axis S by a suitable motor 38 which may be mounted on cover 15. Stirring device 37 may include several blades. The entire stirring device 37, including the blades and the connecting rod by which the stirring device is turned, are all preferably constructed of a suitable steel, coated with a protective refractory material to protect the steel from the molten reactant metal 14. Also, means may be associated with stirring motor 38 for raising stirring device 37 above the level of molten reactant metal 14.

As motor 38 drives stirring device 37 counterclockwise about axis S, the stirring device blades cause the molten reactant metal 14 to circulate generally in the direction of arrows A in FIG. 2. Molten reactant metal 14 at the desired operating temperature circulates from the heating section 11 of the reactor vessel into the reaction section 12 and under chamber walls 47 into reaction chamber 46. After being cooled by contact with the waste material and by the reaction with the waste material, the molten reactant metal 14 flows back into the heating section 11 where it is re-heated back to the desired operating temperature by the electromagnetic field 19 generated by induction heating coil 18.

Coil 18 is connected to a power supply/cooling arrangement 40 which together form an induction heating unit. Since induction heater or furnace power supplies and coil cooling arrangements are well-known in the art of induction furnaces, power supply/cooling arrangement 40 will not be discussed in detail in this disclosure. However, those skilled in the art will appreciate that arrangement 40 includes a power supply for directing an electrical current through coil 18 to generate the electromagnetic field within field boundary 19, and particularly, through the reactant metal 14 contained in heating section 11 of the reactor vessel. This alternating electromagnetic field induces eddy currents in the reactant metal material which may heat the material to high temperatures. Temperatures well in excess of 2000 degrees Celsius may be achieved with such induction heating arrangements, the power supply 40 according to the invention will generally maintain molten reactant metal temperatures between approximately 800 to approximately 2000 degrees Celsius.

Power supply/cooling arrangement 40 also preferably includes means for cooling induction heating coil 18. For example, coil 18 may be made of a tubular conductor and may be cooled by circulating a suitable coolant fluid such as water through the tubular conductor material. Any suitable induction furnace coil cooling arrangement may be employed within the scope of the invention in order to maintain the temperature of coil 18 at a suitable operating temperature.

For a shipboard applications, reactor 10 preferably includes one or more sectioning doors 42 located between reactor heating section 11 and reaction section 12. The sectioning doors 42 may be lowered into the molten reactant metal in the event that the ship encounters high seas when reactor 10 is in operation. High seas could cause the ship to roll sufficiently to splash molten reactant metal 14 excessively within the reactor. The lowered sectioning doors 42 help minimize such splashing.

The illustrated reactor 10 also includes a containment structure 45 associated with the waste input arrangement 21 and solids removal arrangement 22. Containment structure 45 serves to hold the waste material being treated in the reaction section 12 of the reactor vessel. Containment structure 45 also provides an area in which reaction products may collect for removal from the reactor 10. Referring particularly to the FIGS. 1 and 2, containment structure 45 is located outside of the field area having outer boundary 19. This placement of containment structure 45 is necessary because the containment structure is conveniently fabricated using metals. These metals would be inductively heated if they were to be placed within the field area.

The illustrated containment structure 45 includes a reaction chamber 46 defined by chamber walls 47, grating 48, and top 49. Chamber walls 47 extend a short distance into molten reactant metal 14 to form a seal with the surface of the molten metal. While off gas generated by the reaction of waste material with molten reactant metal is released into the area of the chamber 46 above molten reactant metal 14, the molten metal may continue to flow or circulate under walls 47 into the area of the chamber 46 and then back into the heating section of the reactor vessel. This circulation not only helps maintain the desired temperature of molten reactant metal 14 in the reaction section 12 of the vessel, it also carries reaction products which collect at the molten metal surface to the solids removal arrangement 22 shown best in FIG. 2 and described further below. However, grates 48 help contain solid waste material generally in chamber 46 while the waste material is reacting with molten reactant metal 14.

A dunking or submerging arrangement 54 is preferably associated with reaction chamber 46. The dunking arrangement 54 includes a dunking element 55, which may be lowered into molten reactant metal 14 by actuator 56. The dunking arrangement 54 is used to dunk or submerge solid waste materials into molten reactant metal 14 to help facilitate the desired reaction. Once the reaction is complete, the dunking element 55 may be raised by actuator 56 out of molten reactant metal 14 so that additional waste material may be introduced into the reaction chamber 46 generally under the dunker. Actuator 56, which may comprise any suitable actuator, may then be operated to lower dunking element 55 again, dunking the newly introduced solid waste below the surface of the molten reactant metal 14.

Chamber walls 47, and particularly the portions which extend into molten reactant metal 14, along with dunking element 55 and grates 48 may each be formed from a suitable steel or other metal. The metal is preferably coated with a suitable refractory material (not shown), such as fused silica or a ceramic material, to protect the structural metal from the it molten reactant metal 14.

The reaction product removal arrangement includes off gas conduit 60, which, as shown in FIG. 1, is connected to reaction chamber 46. Alternatively, the off gas conduit may be situated in any location in reactor 10 where reaction product gases collect. Conduit 60 directs reaction product gases from reactor 10 to suitable separating equipment (not shown) for separating out various reaction products, particularly carbon liberated from organic molecules in the waste material. Although not shown in the drawings, the separating equipment may include, for example, an aqueous scrubber and solids separator arrangement, a bag house, or any other arrangement for separating the various components included in the gaseous reaction products from molten metal reactor 10.

As shown best in FIG. 3, solid reaction product removal system 22 includes an output chamber 64 which is open to reaction section 12 through opening 65. A series of airlock doors 67 and 68 are positioned between output chamber 64 and an output chute 69. Solid reaction product removal arrangement 22 also includes a scraper or paddle 71 which may be rotated by suitable means such as motor 72 to scrape solid or molten reaction products off the surface of the molten reactant metal 14 into output chamber 64. Alternatively to the rotating scraper 71, a scraping device may be pulled or pushed across the surface of the molten reactant metal 14 by a suitable actuator to move solid or molten reaction products into output chamber 64. Regardless of the means by which solid reaction products are moved into output chamber 64, airlock doors 67 and 68 may be opened sequentially to allow collected solids to drop into chute 69 for removal without allowing substantial amounts of air into the reactor vessel or allowing reaction product gas to exit through the solids removal arrangement.

Referring to FIG. 1, molten metal reactor 10 also includes waste input arrangement 21 associated with reaction section 12 of the reactor vessel. The waste input arrangement 21 shown for purposes of example in FIG. 1 includes an input chamber 75 having an interior airlock door 77 providing access to reaction chamber 46. Input chamber 75 also includes an exterior airlock door 78 through which waste material to be treated may be placed in the input chamber 75 while internal door 77 remains closed. The exterior door 78 may then be closed and a suitable arrangement, such as ram 80 and ram actuator 81, may push the waste material (not shown) from input chamber 75 through open internal door 77 and into reaction chamber 46.

The waste material input arrangement 21 illustrated in FIG. 1 is particularly well-suited for boxed wastes such as boxed biomedical wastes. Such wastes commonly include contaminated plastics, clothing, and other organic material mixed with stainless steel such as contaminated hypodermic needles. Those skilled in the art will appreciate that other waste input or feed arrangements may be utilized with a reactor embodying the principles of the invention. The feed arrangement employed will depend mostly upon the nature of the waste to be treated.

A purge gas arrangement including inert purge gas supply 85 connected to release a suitable inert purge gas into input chamber 75. The purge gas supply maintains a slight positive pressure in input chamber 75 after exterior door 78 is closed to prevent substantial amounts of reaction product gases from entering the chamber when interior door 77 is opened and waste is pushed into reaction chamber 46. Gas supply 85 may also be used to purge the entire reaction chamber 46 and reactor 10 prior to startup or after molten reactant metal is drained from the reactor vessel.

The makeup of the reactant metal will depend primarily upon the content of the waste material to be treated. Reactant alloys comprising a large percent by weight of aluminum, with lesser percentages of calcium, zinc, iron, and copper are suitable for biomedical wastes and wastes which include halogenated hydrocarbons. For example, U.S. Pat. No. 5,167,919 to Wagner discloses aluminum-based reactant metal alloys which are suitable for use in a reactor according to the invention. Also, magnesium or lithium may be used instead of, or in addition to, the aluminum. Alternatively, the reactant metal may comprise substantially pure aluminum. However, those skilled in the art will appreciate that this invention is not limited to any particular reactant metal.

Where the waste to be treated includes radioactive materials, radiation absorbing materials such as lead and/or tungsten are included in the molten reactant metal 14. U.S. patent application Ser. No. 09/096,617, filed Jun. 12, 1998, entitled "REACTANT METAL ALLOY AND TREATMENT PROCESS FOR RADIOACTIVE WASTE," the disclosure of which is incorporated herein by this reference, discloses reactant metal alloys suitable for treating radioactive wastes. For example, lead, tungsten, beryllium, vanadium, yttrium, and/or zirconium, in a concentration range of between about 1% to 25% may be included in the reactant alloy for absorbing radioactive emissions from materials included in the waste material. All concentrations in this disclosure are expressed as a percent by weight of the total reactant alloy. The reactant alloy may also include one or more of the following active alkaline metals:

1% to 25% zinc, 1% to 25% calcium, 1% to 25% copper, 1% to 25% magnesium, 1% to 25% lithium, 10% to 90% aluminum.

These reactant metals are listed here only for purposes of example. Different materials and concentrations may be used within the scope of the invention. For example, larger percentages of radiation absorbing materials may be used depending upon the concentration of radioactive materials in the waste.

The operation of molten metal reactor 10 and the waste treatment method according to the invention may be described with particular reference to FIGS. 1 and 2. Referring to FIG. 1, reactant metal 14 contained in the reactor vessel is heated to a molten state by the induction heating arrangement comprising induction heating coil 18 and induction power supply 40. Since the field area 19 extends only through the heating section 11 of the reactor vessel, the reactant metal in the heating section must first be placed in a molten state and additional metal then added through access opening 36 to increase the volume of molten reactant metal 14 into the reaction section 12 of the reactor vessel.

As the level of molten reactant metal rises into the reaction section 12 of the reactor 10, stirring device 37 is rotated in the molten metal by motor 38 to cause the molten reactant metal to circulate within the reactor vessel. As shown in FIG. 2, the circulation is in the direction of arrows A generally counterclockwise from the heating section 11 through the reaction section 12 and back into the heating section where it is re-heated by field 19. Thus, although the electromagnetic field 19 does not extend into the reaction section 12, fresh molten metal at the desired operated temperature is continuously circulated into the reaction section to produce the desired reaction with waste material introduced through waste input arrangement 21.

According to the invention, spacing material 25 isolates all of the reactor's metallic structural components from the electromagnetic field 19. Thus, the temperature of the molten reactant metal is not limited by any induction heating in structural elements associated with the reactor. Operating temperatures of between 800 to over 2000 degrees Celsius may be maintained in the molten reactant metal with no adverse effects on structural components of the reactor or surrounding structures.

Waste materials are introduced into reaction chamber 46 located in the reaction section 12 of the reactor. As the circulating arrangement 21 circulates molten reactant metal 14 through reaction chamber 46, containment grates 48 hold the waste material in the reaction chamber until it is substantially completely reacted. Gaseous reaction products such as carbon, nitrogen, hydrogen, and certain metal salts release from the metal bath and collect in the portion of reaction chamber 46 above the molten metal. These gases are removed through conduit 60 and are directed to separating equipment (not shown). Solid or liquid reaction products which are lighter than the reactant metal 14 separate to the molten metal surface and the circulation in the metal bath carries this floating material toward solids removal arrangement 22. The floating material collects adjacent to the opening 65 and is periodically scraped into output chamber 64 where it may be removed from the reactor through airlock doors 67 and 68.

Metals which may be included in the waste material or which may be liberated from compounds included in the waste material melt into the molten reactant metal. In particular, radioactive materials, including transuranic elements, go into the metal bath and are widely interspersed with radiation absorbing metals included in the molten reactant metal. The present invention has the advantage that the molten reactant metal 14 may be maintained at high enough temperatures to melt transuranic elements into the bath. Once the bath contains a maximum amount of radioactive material for the given radiation absorbing material contained in the bath, the molten metal may then be drained off or otherwise formed into ingots for long-term storage.

The above described preferred embodiments are intended to illustrate the principles of the invention, but not to limit the scope of the invention. Various other embodiments and modifications to these preferred embodiments may be made by those skilled in the art without departing from the scope of the following claims. For example, the invention is not limited to the generally oblong shaped upper portion of the reactor vessel shown in FIG. 2. More circular shapes may help facilitate the required circulation from the heating section 11 of the reactor to the reaction section 12 or sections. Moreover, many practical details may be included in the reactor vessel within the scope of the invention. For example, features such as drain channels may be formed in the bottom surfaces of both the reaction section and heating section of the reactor vessel to help drain molten metal from the vessel.

What is claimed is:

1. A molten metal reactor comprising:
    (a) a reactor vessel adapted to contain a molten reactant metal, the reactor vessel including a heating section;
    (b) an induction heating unit including an induction heating power supply and an induction heating coil, the induction heating power supply being operatively connected to apply an alternating electrical current through the induction heating coil to induce an alternating electromagnetic field residing in a field area, a portion of the field area extending through the heating section of the reactor vessel;
    (c) a circulating device, positioned outside of the field area, for circulating molten reactant metal between the heating section of the reactor vessel and a section of the reactor vessel located outside of the field area; and
    (d) a waste material input arrangement connected to the reactor vessel, the waste material input arrangement positioned outside of the field area.

2. The molten metal reactor of claim 1 wherein the reactor vessel includes a dielectric lining and further comprising:
    (a) dielectric spacing means associated with the heating section of the reactor vessel, the dielectric spacing means for isolating electrically conductive components from the field area.

3. The molten metal reactor of claim 1 further comprising:
    (a) a reaction section of the reactor vessel, the reaction section of the reactor vessel being located outside of the field area.

4. The molten metal reactor of claim 3 further comprising:
    (a) a reaction product removal arrangement connected to the reactor vessel, the reaction product removal arrangement positioned outside of the field area.

5. The molten metal reactor of claim 4 wherein:
    (a) the circulating device is adapted to circulate molten reactant metal between the heating section of the reactor vessel and the reaction section;
    (b) the waste material input arrangement is connected to the reaction section of the reactor vessel; and
    (c) the reaction product removal arrangement is connected to the reaction section of the reactor vessel.

6. The molten metal reactor of claim 2 further comprising:
    (a) a containment shell surrounding the dielectric spacing material.

7. The molten metal reactor of claim 1 wherein the reactor vessel includes a lining made of a refractory material.

8. The molten metal reactor of claim 1 further comprising:
    (a) a loose silica material surrounding the induction heating coil.

9. The molten metal reactor of claim 1 wherein the induction heating coil is made of a tubular conductor, and further comprising:

(a) cooling means for circulating a coolant fluid through the coil.

10. The molten metal reactor of claim 3 further comprising:
   (a) a reaction containment arrangement for containing solid waste material and reaction products in the reaction section of the reactor vessel.

11. The molten metal reactor of claim 3 further comprising:
   (a) a sectioning arrangement for blocking flow of molten reactant metal between the heating section of the reactor vessel and the reaction section of the reactor vessel.

12. A method for treating waste materials, the method comprising the steps of:
   (a) inducing an alternating electromagnetic field through a field area including a reactant metal contained in a reactor vessel, the electromagnetic alternating field maintaining the reactant metal in a substantially molten state in the field area;
   (b) inducing the molten reactant metal to circulate between locations included in the field area and a reaction section of the reactor vessel located outside of the field area;
   (c) introducing waste material into the reaction section of the reactor vessel; and
   (d) removing reaction products from the reactor vessel.

13. The method of claim 12 further comprising the step of:
   (b) positioning a dielectric spacing material in the portion of the electromagnetic field which extends beyond the reactant metal and the reactor vessel.

14. The method of claim 12 wherein the electromagnetic field is developed by passing an induction current through an induction heating coil and further comprising the step of:
   (a) circulating a coolant fluid through the induction heating coil.

15. The method of claim 12 wherein the step of inducing the molten reactant metal to circulate comprises the step of:
   (a) rotating a stirring element in the molten reactant metal at a location outside of the field area.

16. The method of claim 12 further comprising the step of:
   (a) containing solid waste material and solid reaction products in the reaction section of the reactor vessel.

17. The method of claim 12 wherein the step of introducing waste material into the reaction section of the reactor vessel includes the step of:
   (a) extending a submerging device into the molten reactant metal in the reaction section of the reactor vessel to hold the waste material under the surface of the molten reactant metal.

18. A molten metal reactor comprising:
   (a) a reactor vessel adapted to contain a molten reactant metal;
   (b) an induction heating arrangement for producing an alternating electromagnetic field in a field area, a portion of the field area extending through a section of the reactor vessel;
   (c) a circulating device, positioned outside of the field area, for circulating molten reactant metal between a portion of the reactor vessel within the field area and a portion of the reactor vessel located outside of the field area; and
   (d) a waste material input arrangement connected to the reactor vessel, the waste material input arrangement positioned outside of the field area.

19. The molten metal reactor of claim 18 wherein the reactor vessel includes a dielectric lining and further comprising:
   (a) dielectric spacing material positioned adjacent to the section of the reactor vessel encompassed by the field area, the dielectric spacing material for isolating electrically conductive components from the field area.

20. The molten metal reactor of claim 18 further comprising:
   (a) a reaction product removal arrangement connected to the reactor vessel, the reaction product removal arrangement positioned outside of the field area.

\* \* \* \* \*